(12) United States Patent
Reibel et al.

(10) Patent No.: US 11,560,916 B2
(45) Date of Patent: Jan. 24, 2023

(54) BOLT ATTACHMENT

(71) Applicant: ILLINOIS TOOL WORKS INC., Glenview, IL (US)

(72) Inventors: Viviane Reibel, Ahorn-Schillingstadt (DE); Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 380 days.

(21) Appl. No.: 16/985,604

(22) Filed: Aug. 5, 2020

(65) Prior Publication Data

US 2021/0048056 A1 Feb. 18, 2021

(30) Foreign Application Priority Data

Aug. 14, 2019 (DE) ...................... 10 2019 121 911.6

(51) Int. Cl.
*F16B 33/00* (2006.01)
*F16B 37/08* (2006.01)

(52) U.S. Cl.
CPC .............. *F16B 33/00* (2013.01); *F16B 37/08* (2013.01)

(58) Field of Classification Search
CPC ........ F16B 21/086; F16B 33/00; F16B 37/08; F16B 39/32; Y10S 411/949; Y10S 411/95; Y10S 411/951; Y10S 411/952; Y10S 411/953
USPC ......... 411/326–331, 366.1, 508–510; 24/453
See application file for complete search history.

(56) References Cited

U.S. PATENT DOCUMENTS

| | | | | |
|---|---|---|---|---|
| 544,605 | A * | 8/1895 | Woolcock | F16B 39/32 411/328 |
| 545,516 | A * | 9/1895 | Mershon | F16B 39/32 411/933 |
| 5,537,783 | A * | 7/1996 | Kazino | E05F 11/385 411/366.1 |
| 6,070,836 | A | 6/2000 | Battie | |
| 7,549,199 | B2 * | 6/2009 | Bugner | F16B 5/0628 411/908 |
| 8,707,525 | B2 * | 4/2014 | Davies | F16B 5/0628 24/297 |

(Continued)

FOREIGN PATENT DOCUMENTS

| | | |
|---|---|---|
| DE | 19634309 A1 | 2/1998 |
| DE | 102010034006 A1 | 2/2012 |
| EP | 3444485 A1 | 2/2019 |

*Primary Examiner* — Roberta S Delisle
(74) *Attorney, Agent, or Firm* — Thompson Hine LLP (57) ABSTRACT

A bolt fastener includes a plurality of fixing structures that are arranged radially around a receiving space for a bolt and are axially pivotable, wherein the fixing structures have, in the direction of an axial receiving space for a fastening bolt, engagement faces for engagement with a bolt and have, at diametrically opposite ends, bearing faces with which the fixing structures are supported counter to an outward movement, wherein bearing structures for the bearing faces are also provided, which cooperate in a supporting manner with the bearing faces, wherein the bearing face and bearing structure are dimensioned such that they disengage when the fixing structures are pivoted counter to the insertion direction of the bolt, wherein the radial spacing between the bearing structures and a bolt mounted in the receiving space is smaller than the entire extent of the fixing structures.

11 Claims, 12 Drawing Sheets

(56) References Cited

U.S. PATENT DOCUMENTS

| | | | | |
|---|---|---|---|---|
| 2006/0000064 A1* | 1/2006 | Leverger | ................. | F16B 21/09 24/297 |
| 2007/0098523 A1* | 5/2007 | Klein | .................... | F16B 5/0628 411/508 |
| 2011/0311335 A1* | 12/2011 | Wike | ..................... | A43B 23/24 411/508 |

* cited by examiner

BOLT ATTACHMENT

TECHNICAL FIELD

The invention relates to a bolt attachment, in the nature of a bolt fastener.

BACKGROUND

In particular in motor vehicles, and also in aircraft, it is common practice to provide fastening bolts on a vehicle body or other bodies, said fastening bolts protruding from the body or the vehicle body and serving to arrange components, assemblies, holders and the like here.

Bolts of this kind are usually bolts with an external contour that allows engagement by a bolt fastener. In the simplest case, a bolt of this kind can have an in particular standardized screw thread, onto which a corresponding counterpart, for example a nut, can be screwed.

Furthermore, it is conventional to push latching elements onto the thread.

In the case of plastics, bolts of this kind can be attached to a surface by adhesive bonding, friction welding or similar processes, and in the case of metal vehicle bodies or bodies, it is conventional to fasten bodies of this kind using the joining methods conventional for metal materials, but in particular via welding.

In particular, elements in motor vehicles are now fastened for example to trim elements using bolts of this kind.

EP 3 444 485 A1 discloses a fastening element and a fastening arrangement, wherein this fastening arrangement is intended to be placed on a fastening bolt that has a fastening bolt head that is pushed through an opening into the device and the undercut of which is then engaged behind in order to effect fastening. In order to keep the fastening under tension, resilient elements are provided.

Furthermore, the prior art discloses fastening in particular trim elements with anchor foot fasteners in holes in vehicle bodies, in particular door trim elements of motor vehicles.

In known fastening mechanisms, fastening has to take place blind, i.e. without each individual fastening element being engaged visibly.

SUMMARY

It is the object of the invention to create a bolt fastener that is mountable and demountable in a blind manner.

The bolt fastener according to the invention is constructed such that, on the one hand, fastening to the bolt takes place reliably, but blind demounting is also possible.

The holding forces in the bolt fastener are released constructively here such that a minimum holding force is reliably achieved in order to hold the bolt fastener and thus a component using one or more bolts.

Furthermore, it is also possible with the invention to release the bolt fastener again even without further manipulation using tools and to detach both the bolt fastener and the component suspended thereon, for example a door trim element, in an undamaged manner and to fasten it again with the same bolt fastener.

The inventors have found that it is necessary, for nondestructive mounting and demounting, including repeated demounting and mounting, desired by the producer, to adhere to certain minimum and maximum forces. In particular, it is possible with the invention to already meet requirements for repeated mounting and demounting during the production of a motor vehicle.

In the event of repairs, in particular when trim elements have to be removed, it is also possible with the invention to reliably demount and mount them again using the same means.

The invention relates to a bolt fastener comprising a plurality of fixing means that are arranged radially around a receiving space for a bolt and are axially pivotable; wherein the fixing means have, in the direction of an axial receiving space for a fastening bolt, engagement faces for engagement with a bolt and have, at diametrically opposite ends, bearing faces with which the fixing means are supported counter to an outward movement, wherein the bearing means for the bearing faces are also provided, which cooperate in a supporting manner with the bearing faces, wherein the bearing face and bearing means are dimensioned such that they disengage when the fixing means are pivoted counter to the insertion direction of the bolt, wherein the radial spacing between the bearing means and a bolt mounted in the receiving space is smaller than the entire extent of the fixing means.

It is advantageous when the fixing means are arranged in a suspended manner on axially and radially resilient spring arms, wherein the fixing means are arranged on the spring arms with lateral regions between the engagement faces and the end faces.

In the case of the invention, a bearing face of the fixing element is advantageously formed with a convex curvature and the bearing means is in the form of a socket with a corresponding concave curvature.

Furthermore, the concave curvature of the socket may be oriented such that the curvature arc does not go beyond a horizontal plane with regard to the axial insertion direction.

Furthermore, it is advantageous when guide cheeks that extend radially inward are arranged on both sides of the sockets, said guide cheeks laterally delimiting the fixing means with regard to the mobility thereof.

In one embodiment, the fixing means are in the form of blocking elements, which are substantially cuboidal elements that extend radially outward from a receiving space and have, on a face radially facing the receiving space, the curved engagement face for engagement in a fastening bolt.

It is also advantageous when the engagement face is formed in particular in a radially curved manner and a sawtooth-like and/or threaded-portion-like contour is formed as corresponding engagement means for the thread or the contour of a fastening bolt projecting through an insertion opening.

Furthermore, it is advantageous when respective spring arms are arranged on the inside radially on both sides of the blocking elements, wherein the spring arms initially extend inward in parallel from an inner face of an outer wall and are bent toward the blocking elements, wherein the spring arms end with free ends, wherein, at the level of the free ends, the spring arms are arranged on respective side faces of the blocking elements.

Moreover, it is also advantageous when the spring arms and the blocking elements are arranged with respect to one another such that, in the force- and load-free state, the blocking elements extend in an inclined manner toward the axial center or toward the receiving space in the insertion direction of a bolt, such that when a bolt is inserted, the blocking elements are pivotable in the insertion direction in order to ensure that the bolt passes through, and in the event of a withdrawal movement of the bolt, are pivoted by the bolt into the receiving space such that they are supported on the sockets on one side with their bearing faces and engage in the contour of a bolt on the other side with the engagement means of the engagement faces.

In an advantageous embodiment, a mounting unit consisting of the bolt fastener and an anchor clip is formed, wherein the anchor clip has a bolt and blocking means are present on the anchor clip that cooperate in a latching blocking manner with corresponding blocking means of a bolt fastener such that the blocking is released only when the anchor clip is latched fully in an opening provided for this purpose and the bolt fastener is able to be pushed fully onto the bolt.

BRIEF DESCRIPTION OF THE DRAWINGS

The invention is explained by way of example with reference to a drawing, in which.

DETAILED DESCRIPTION

Figure 1:
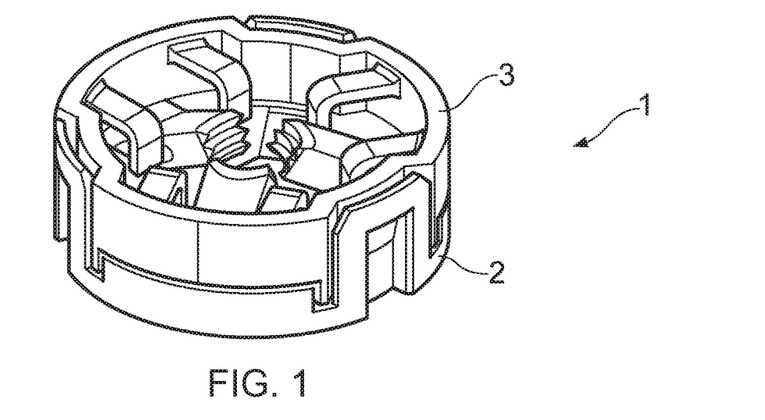
FIG. 1 shows the bolt fastener according to the invention in a perspective side view.

The bolt fastener 1 according to the invention (FIGS. 1-3) has a bolt fastener bottom part 2 (FIG. 2) and a bolt fastener top part 3, which are able to be fastened together.

The structure made up of a bolt fastener bottom part 2 and a bolt fastener top part 3 is substantially production-related and is intended to be by way of example here. Of course, with appropriate manufacturing methods, for example 3D printing, one-piece manufacture is also readily possible.

Figure 2:
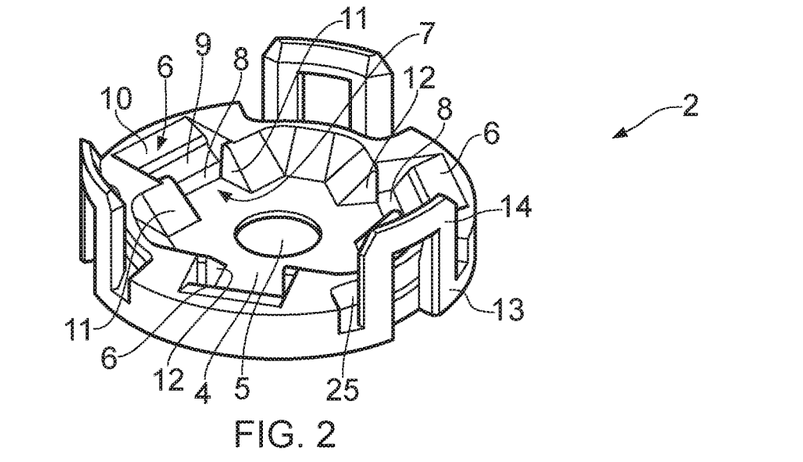
FIG. 2 shows a bottom part of the bolt fastener according to the invention in a perspective view from the side.

The bolt fastener bottom part 2 has a bottom wall 4, at the center of which an in particular round insertion opening 5 for a bolt is provided.

Present around the insertion opening 5 and spaced apart therefrom are a plurality of bearing blocks 6, in which bearing sockets 7 are arranged. The bearing sockets 7 are in this case configured such that, on a face of the bearing block 6 that radially faces the insertion opening 5, first of all an inclined ramp 8 is present, which transitions into the actual concavely curved socket 9, which has for example an arc length of a quarter to an eighth of a circle and transitions into a further inclined top face 10.

Formed in a manner protruding radially with respect to the insertion opening 5 and on both sides of each bearing block 6 or on both sides of each bearing socket 7 are guide cheeks 11, which protrude radially beyond the socket 9 in the direction of the insertion opening 5 and bound, with guide faces 12, a space or gap between one another.

In the case of a multipart structure of the bolt fastener 1 made up of a bolt fastener bottom part 2 and a bolt fastener top part 3, latching tabs 14 that point axially in one direction are present on an encircling outer wall 13.

The number of bearing sockets 7 and bearing blocks 6 and accordingly twice the number of guide cheeks 11 is in principle freely selectable and is three in the present example, such that three bearing blocks 6 and accordingly six guide cheeks 11 are arranged in a manner distributed symmetrically radially around the insertion opening 5.

The encircling wall 13 in the present embodiment according to FIG. 2 is circular but the outer shape of the bolt fastener is unimportant and can be adapted in particular to the use and to the component to be fastened.

Figure 3:
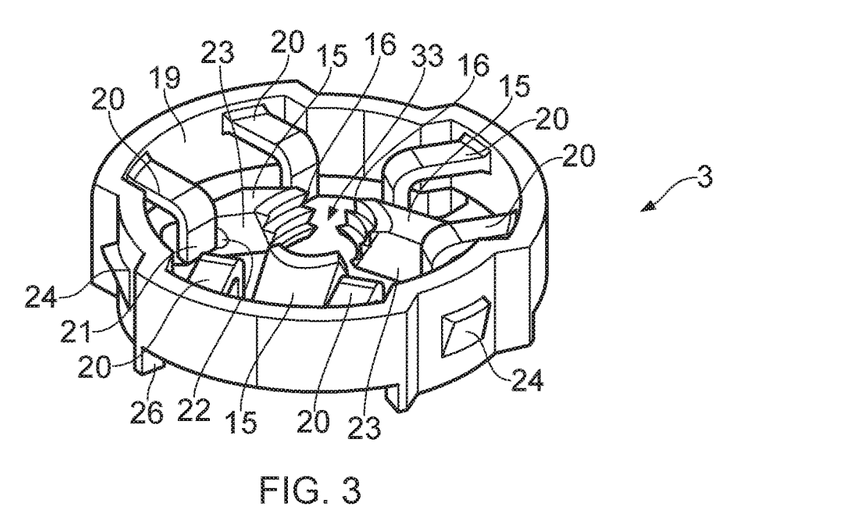
FIG. 3 shows a top part of the bolt fastener according to the invention in a perspective side view.
Figure 4:
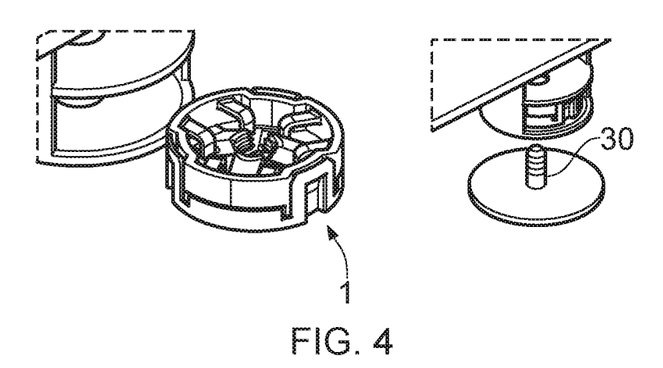
FIG. 4 shows the bolt fastener on a planar component before fastening to a bolt.
Figure 5:
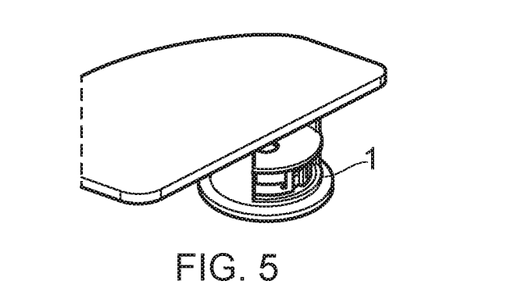
FIG. 5 shows the bolt fastener according to FIG. 4 in the mounted state.
Figure 6:
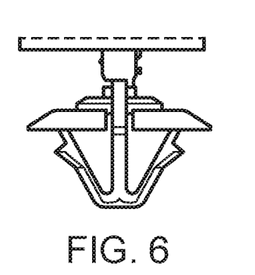
FIG. 6 shows the bolt fastener according to the invention with a flat component in a premounting state with a bolt carrier or clip bolt.
Figure 7:
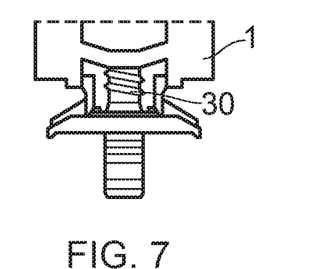
FIG. 7 shows the bolt fastener according to the invention with a clip bolt in a view rotated through 90° with respect to FIG. 6.

At the level of the bearing blocks 6, blocking elements 15 are arranged in the fastener top part 3 (FIG. 3).

The blocking elements 15 are substantially cuboidal elements that extend outward radially from an axial center or an axial plane of the pass-through opening or insertion opening 5.

The axial center or the imaginary cylindrical region above the insertion opening 5 within the bolt fastener defines a receiving space 33 for a bolt 30. Toward the axial center or toward the receiving space 33, the blocking elements 15 have an engagement face 16.

The engagement face 16 is formed in a radially curved manner and has a sawtooth-like or threaded-portion-like contour as corresponding engagement means for the thread or the contour of a fastening bolt 30 projecting through the insertion opening 5.

To this end, the blocking elements 15 are arranged radially such that they project to a certain extent into the axial plane of the insertion opening 5 or into the receiving space 33, such that they can come into correct engagement with the bolt (not shown).

On an end face 17 opposite to the engagement face 17, the blocking elements are formed with an axial curvature, wherein the axial curvature 18 corresponds in terms of its radius preferably to the radius of the socket.

In order to keep the blocking elements 15 radially in position, respective spring arms 20 are arranged on an encircling outer wall 19, which has preferably a contour that corresponds or is identical to the outer wall 13, on the inside radially on both sides of the blocking elements 15.

The spring arms 20 initially extend inward in parallel from the inner face of the outer wall 19 and are then bent toward the blocking elements 15. For example, the spring arms are bent through 90°, but the size of the bend is not important. The spring arms 20 end with free ends 21, wherein, at the level of the free ends 21, the spring arms 20 have bearing extensions 22, pointing toward one another, that are formed for example in a narrow cylindrical manner and are attached both to the spring arm 20 and to the blocking elements 15 at a side face 23 of the blocking elements 15 on opposite sides of the latter.

During manufacture, preferably axial angling of the blocking elements 15 is provided in this case, such that the blocking elements 15 extend in a manner inclined upwardly toward the axial center.

In addition, the bolt fastener top part 3 has, on the outside of the outer wall 19, latching protrusions 24 that cooperate in a manner known per se with the latching tabs 14 in order to keep the bolt fastener top part latched to the bolt fastener bottom part.

Radially within the latching tabs 14, guide slots 25 can be present and corresponding guide protrusions 26, shaped in a corresponding manner, can be present beneath the latching protrusions 24 on the bolt fastener top part 3 in order to ensure correctly positioned mounting.

Figure 8:
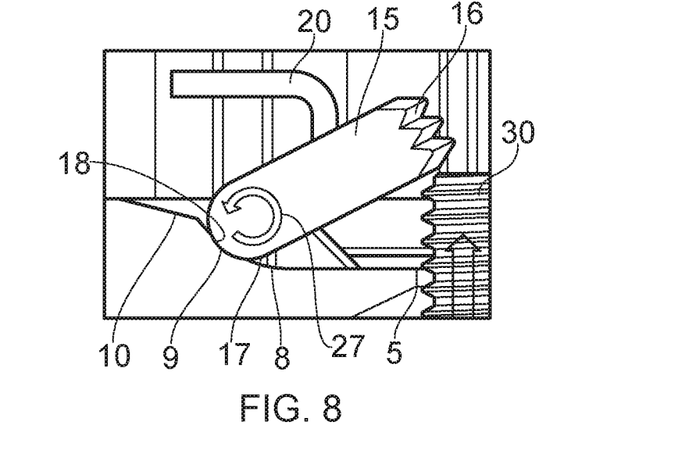
FIGS. 8-11 show the different stages in the insertion and withdrawal of a bolt into and out of the bolt fastener.
Figure 9:
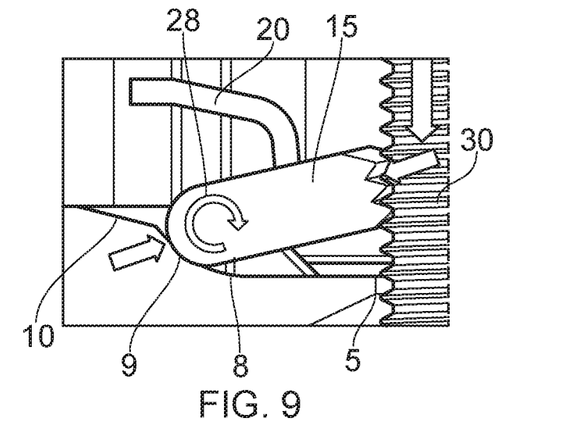

In the assembled state of the bolt fastener bottom part with the bolt fastener top part or in the case of a one-piece embodiment of the bolt fastener, in a starting position (FIG. 8), the blocking elements 15 are located with the curvature 18 of their end face 17 in the region of the socket 9 and are arranged on the spring arms 20, or are suspended thereon, in a manner extending obliquely upward with respect to the axial center. The bearing extensions 22 in this case engage approximately in the radial center of the blocking elements 15 between the end face 17 and the engagement face 16. If a fastening bolt 30 is pushed through the insertion opening 5 into the bolt fastener 1 (FIG. 8), the blocking elements 15 can accordingly yield to the fastening bolt 30 in the arrow direction 27 and are pivoted further in the insertion direction. Once the bolt has been fully inserted (FIG. 9), the blocking elements pivot slightly toward the longitudinal center as per the arrow direction 28 and engage with their contoured engagement face 16 in a correspondingly contoured face 31 of the bolt 30. In this position, the bolt 30 is held in the bolt fastener with a minimum force by the blocking elements, wherein, in this position, the blocking elements continue to have a slight upward inclination in the direction of the transverse center, such that they are supported against the bolt on the rear side by the socket 9.

Of course, it goes without saying that the number of blocking elements 15 corresponds to the number of sockets 9 and, as in the example shown, is for example three, although it is also possible for fewer or more blocking elements to be present, wherein preferably the sum of the engagement faces 16 or the arc length of the engagement face 16 as a whole around the bolt is slightly less than a complete circle and optionally spacing gaps are present between the engagement faces 16 of the blocking elements 15.

For demounting the bolt and the bolt fastener traction is exerted (FIG. 10, FIG. 11) on the bolt fastener 1 such that the bolt is withdrawn from the insertion opening 5.

Figure 10:
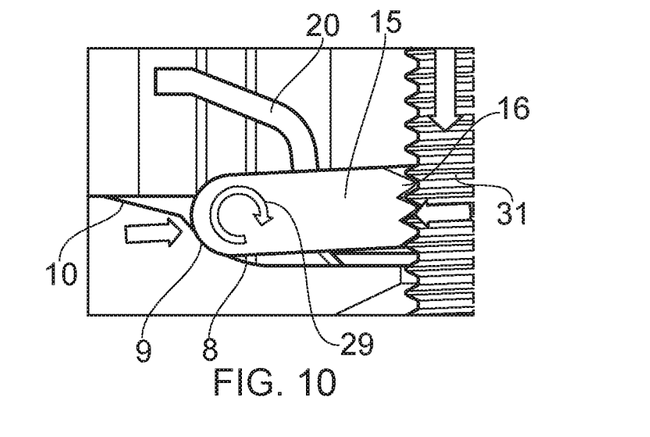
Figure 11:
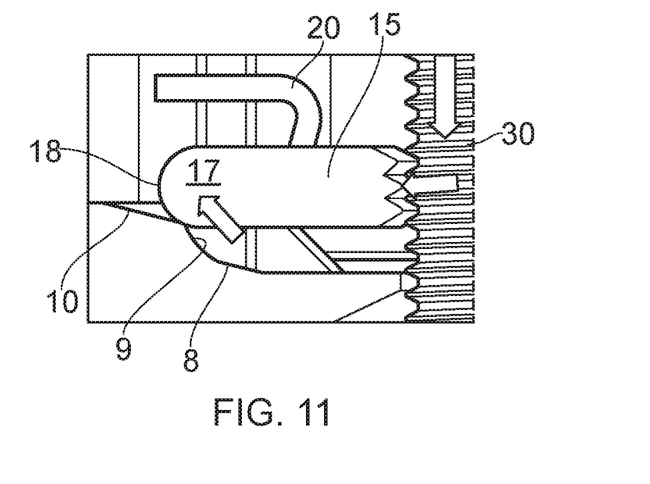
Figure 12:
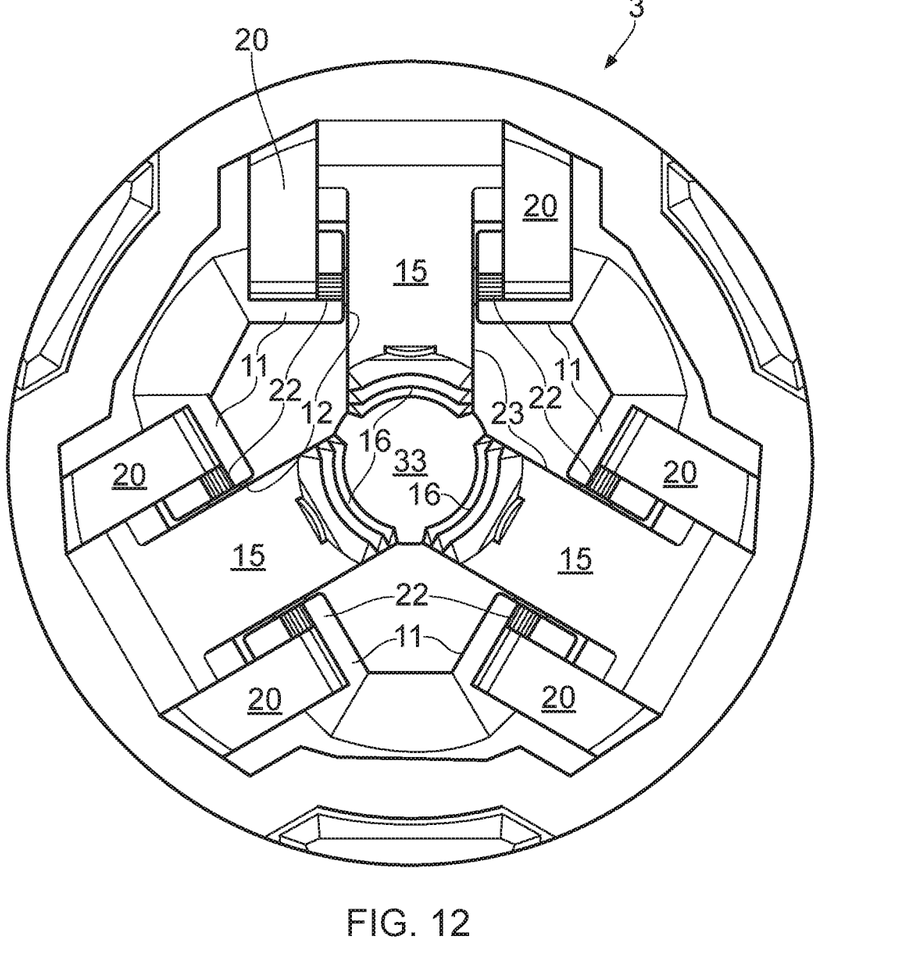
FIG. 12 shows the bolt fastener according to the invention in an unmounted state in a plan view.
Figure 13:
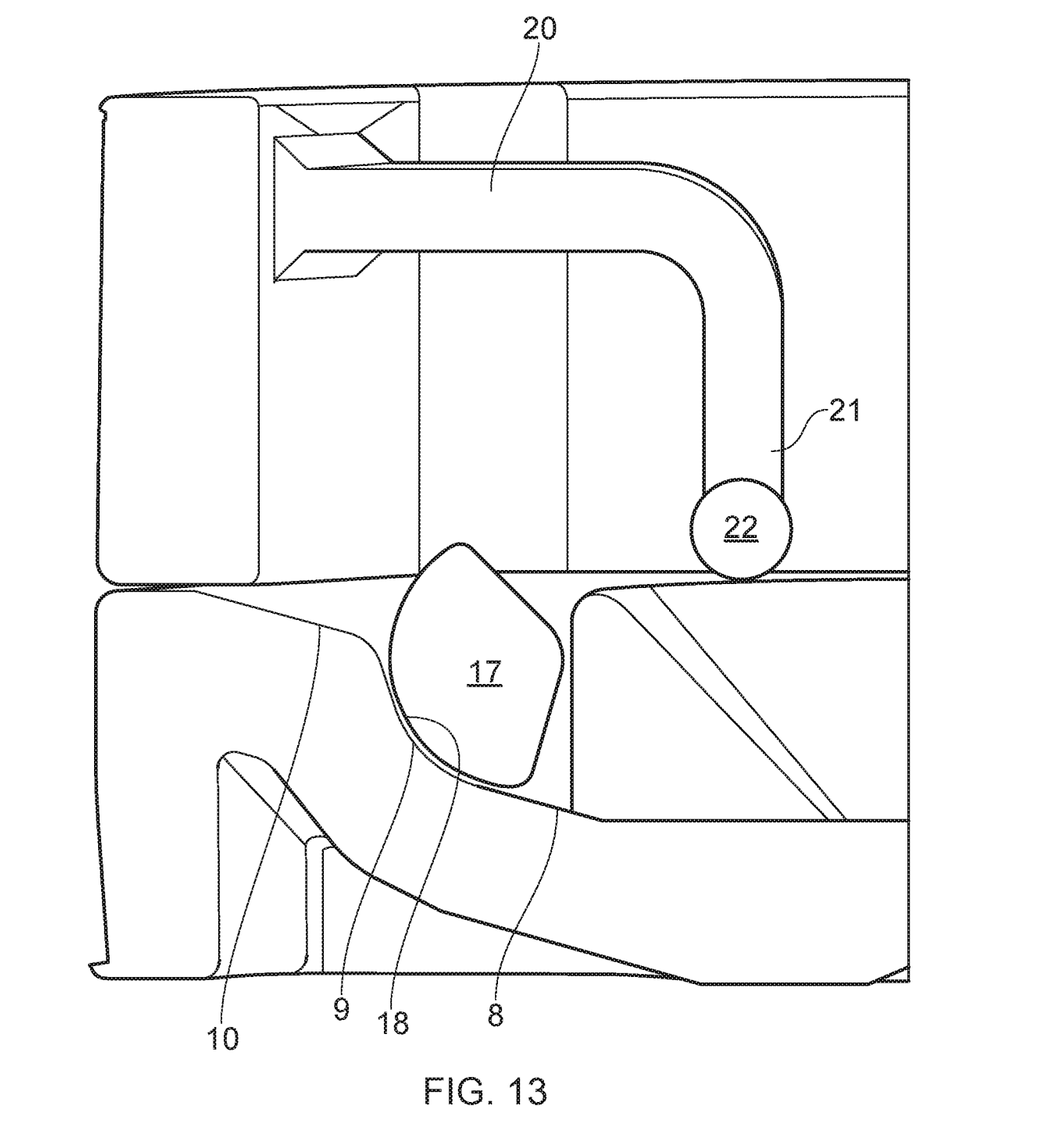
FIG. 13 shows a spring arm of the bolt fastener with an attachment element for a blocking element.
Figure 14:
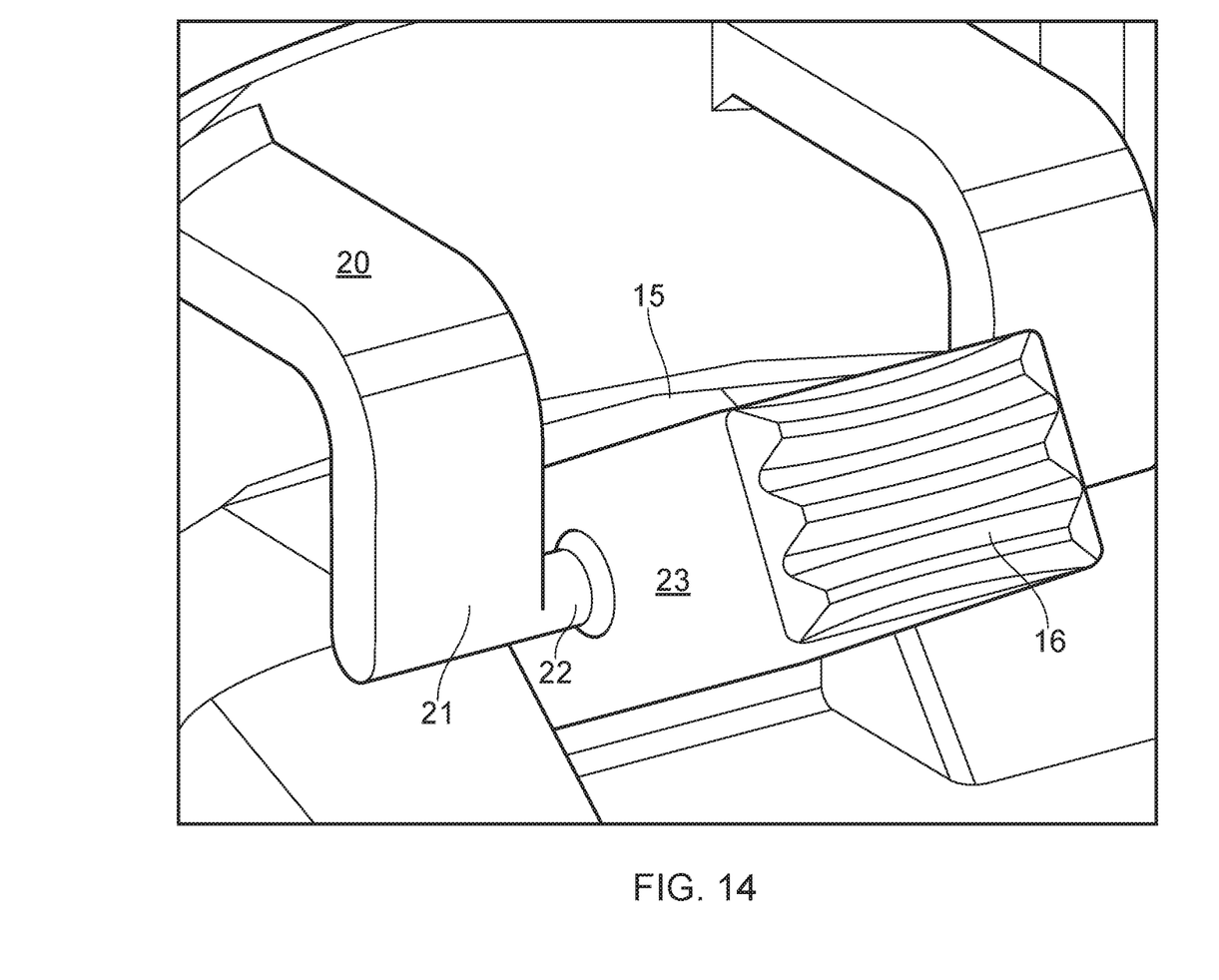
FIG. 14 shows a bolt element with a spring arm arranged thereon.
Figure 15:
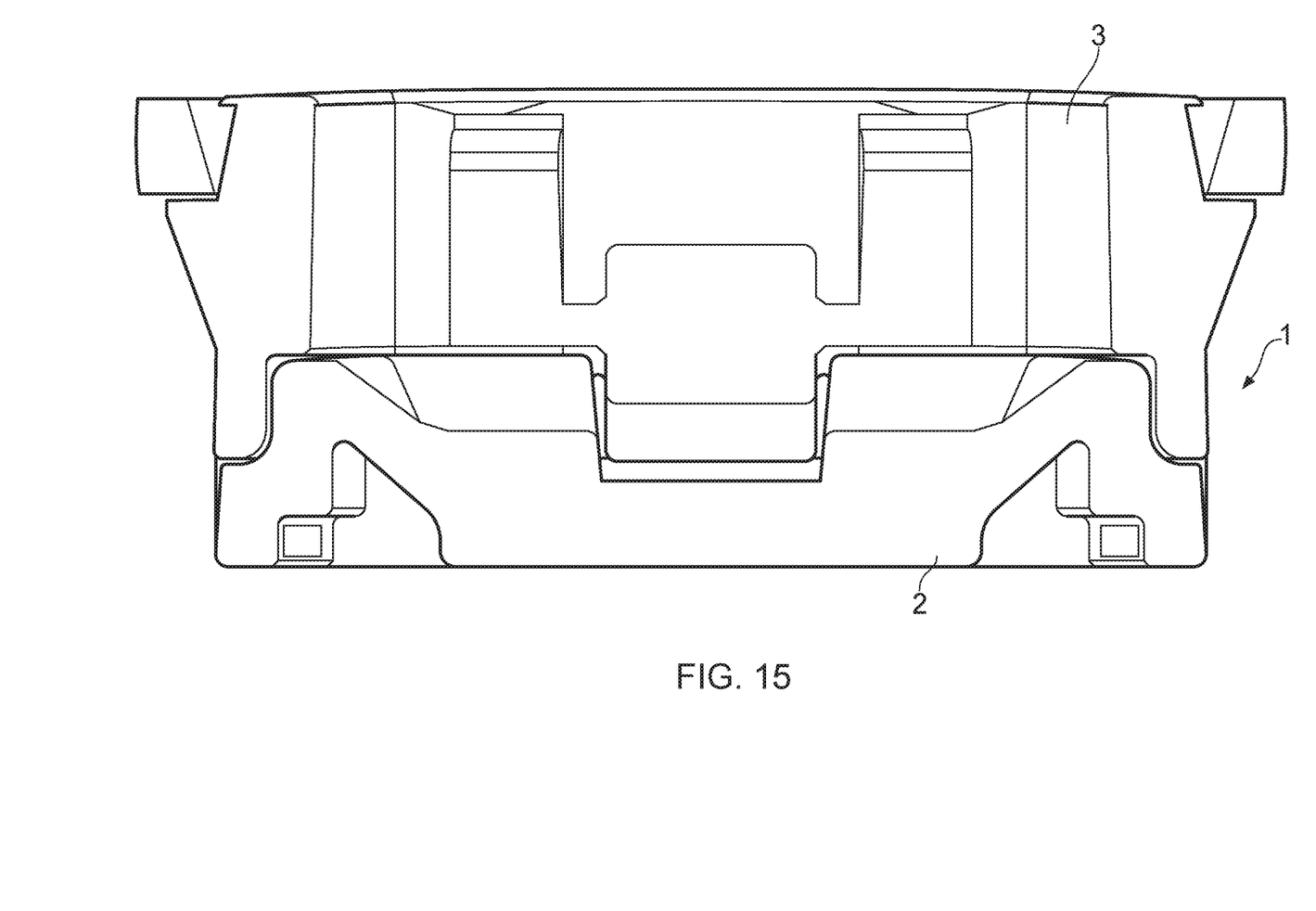
FIG. 15 shows the bolt fastener according to the invention in a side view.
Figure 16:
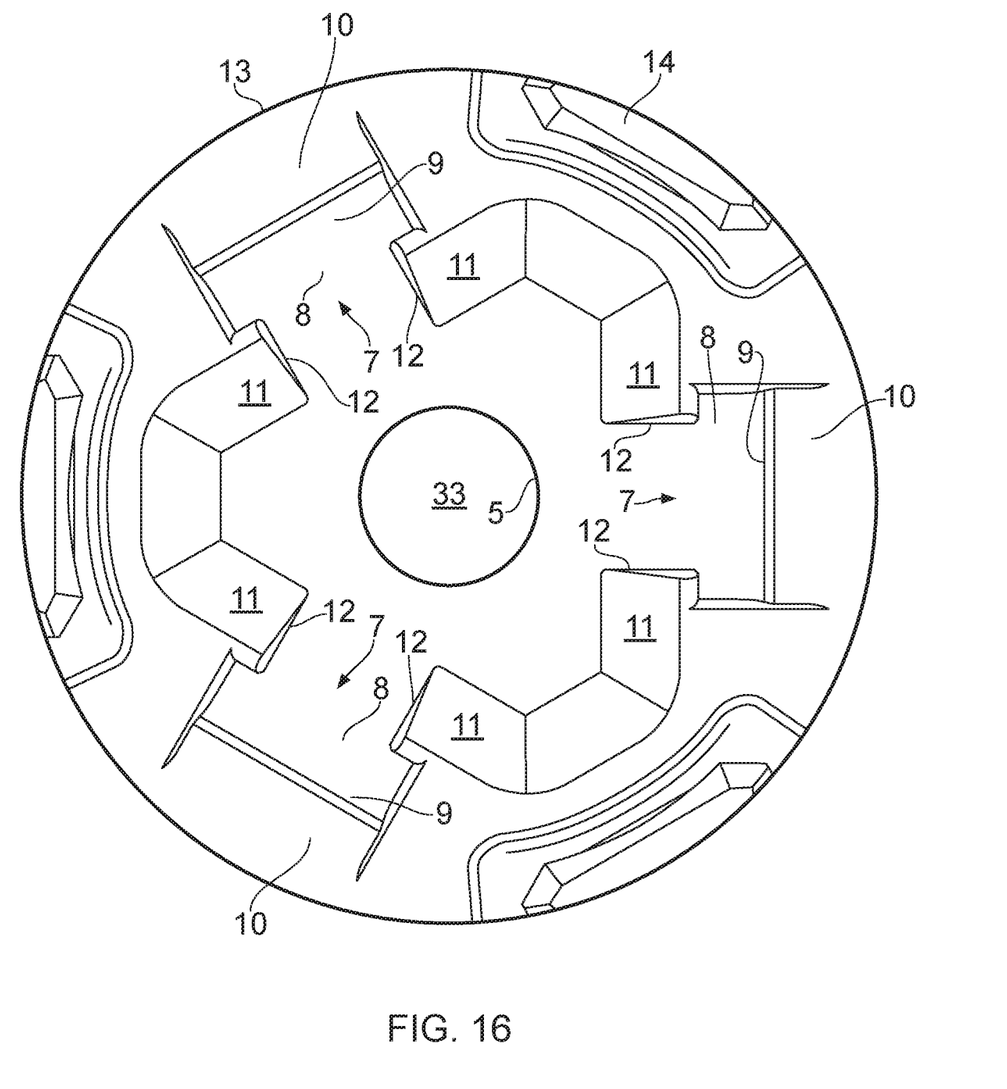
FIG. 16 shows the bolt fastener according to the invention in a plan view of the bottom part.
Figure 17:
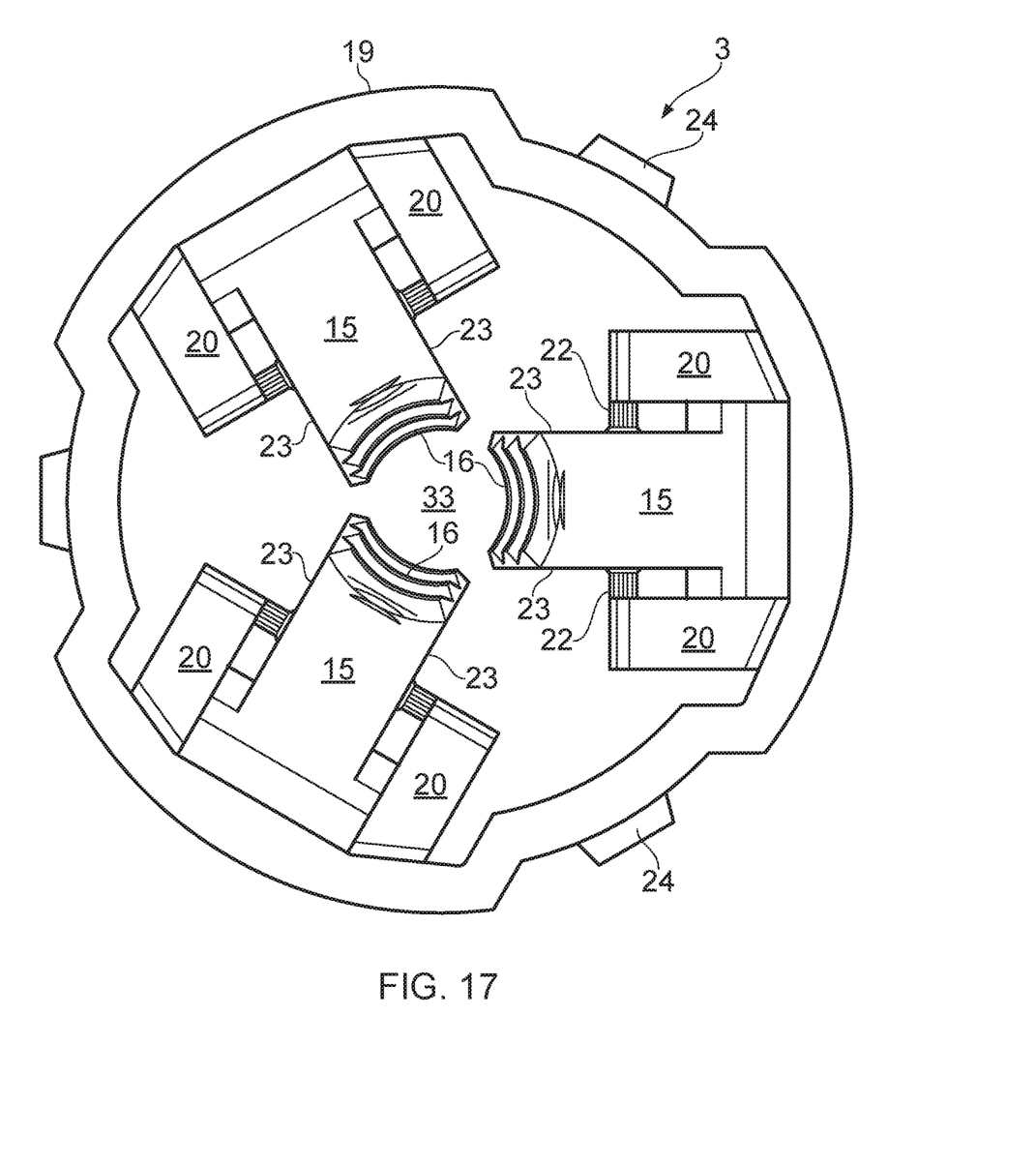
FIG. 17 shows the bolt fastener according to the invention in a plan view of the top part.

This is initially prevented by a predetermined force, wherein the blocking elements 15 are rotated further in the socket 9 in accordance with the arrow direction 29.

As a result of this rotation and at the same time the pressure that the bolt exerts on the blocking elements 15, the curved faces 17 pass out of the socket 9 into the region of the inclined top face 10, on which they slide radially outward. As a result, the blocking elements 15 free up the withdrawal path for the fastening bolt in that the engagement faces 16 are no longer in frictional engagement with the outer contour 31 of the bolt.

The socket 9 thus acts as a counter bearing for the blocking elements 15, which act as pivotable fixing means and can be pushed out of their bearing seat in the socket 9 counter to the force of the spring arms 20. The socket 9 is thus shaped and dimensioned such that, when they are pivoted in the withdrawal direction, i.e. into a horizontal position, the blocking elements 15 are lifted out of the bearing seat or the socket 9 radially toward the outside by the pressure of the bolt 30 and as a result release the bolt 30. The radial length between the socket 9, or the surface thereof, and an outer face of the bolt is in this case less than the corresponding length of the blocking elements 15, such that a corresponding pressure is able to be built up during pivoting. This is optionally further supported in that the attachment regions of the spring arms 20 or the bearing extensions 22 are located axially above the socket 9, such that, in the starting position of the blocking elements 15, the spring arms 20 do not exert any force, but during pivoting in the withdrawal direction, the spring arms 20 develop an axial force counter to the withdrawal direction, which helps to support the lifting out of the sockets 9.

As soon as the bolt 5 has been withdrawn from the bolt fastener, the blocking elements 15 snap, with the aid of the spring arms 20, back into their basic position extending slightly obliquely upward and the bolt fastener can be used for another locking operation.

Figure 18:
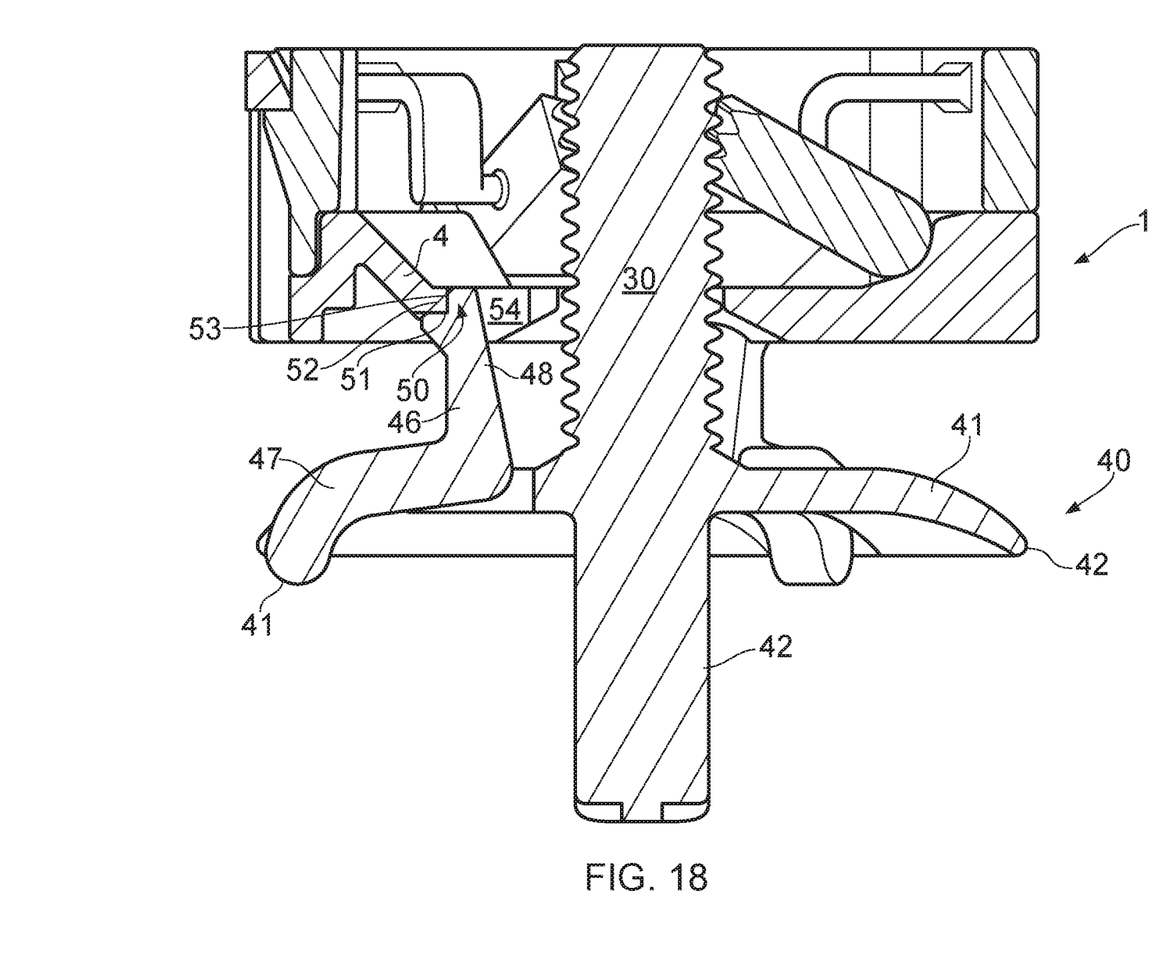
FIG. 18 shows a further embodiment in which the bolt fastener according to the invention is combined with an anchor clip.
Figure 19:
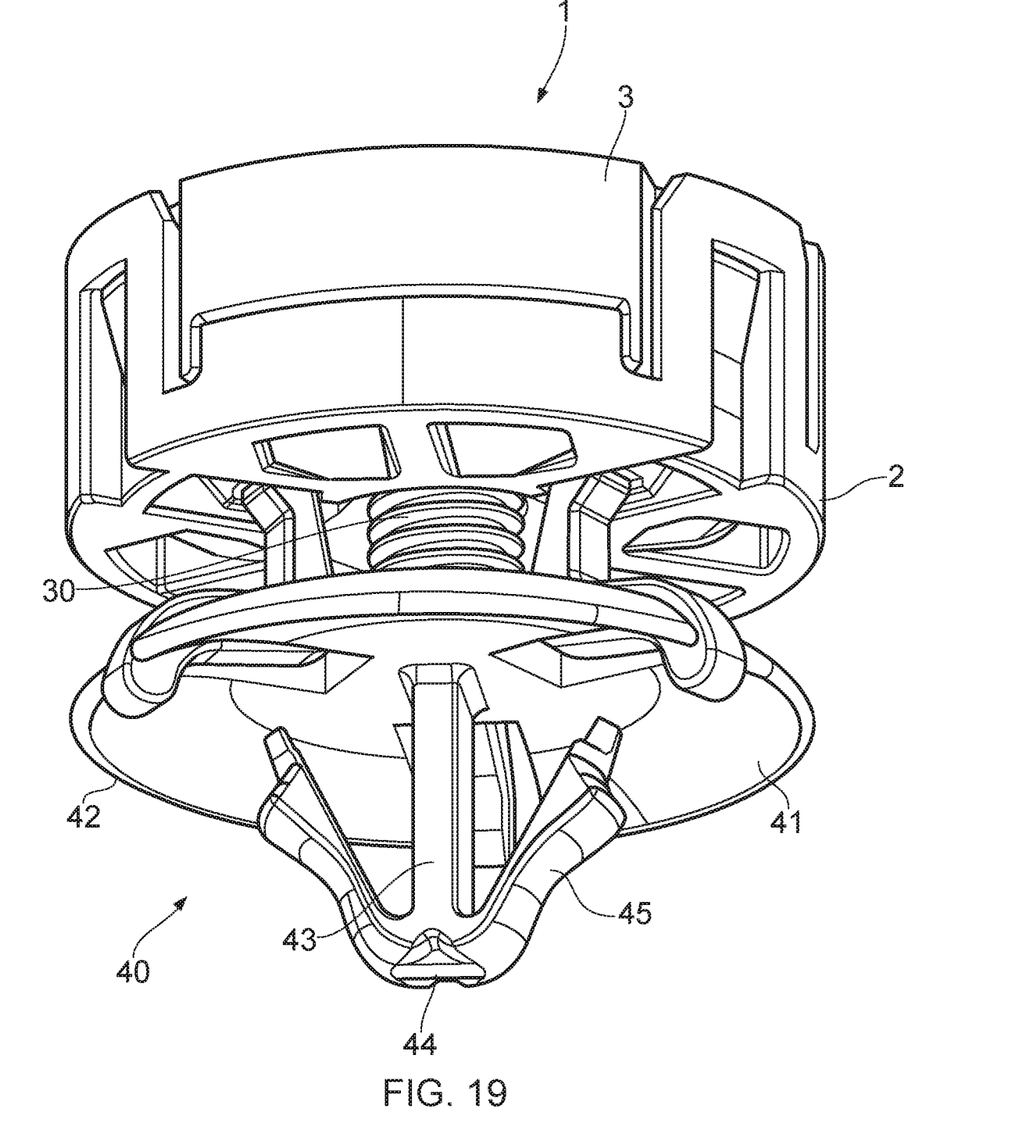
FIG. 19 shows the arrangement according to FIG. 18 in a perspective view from below.
Figure 20:
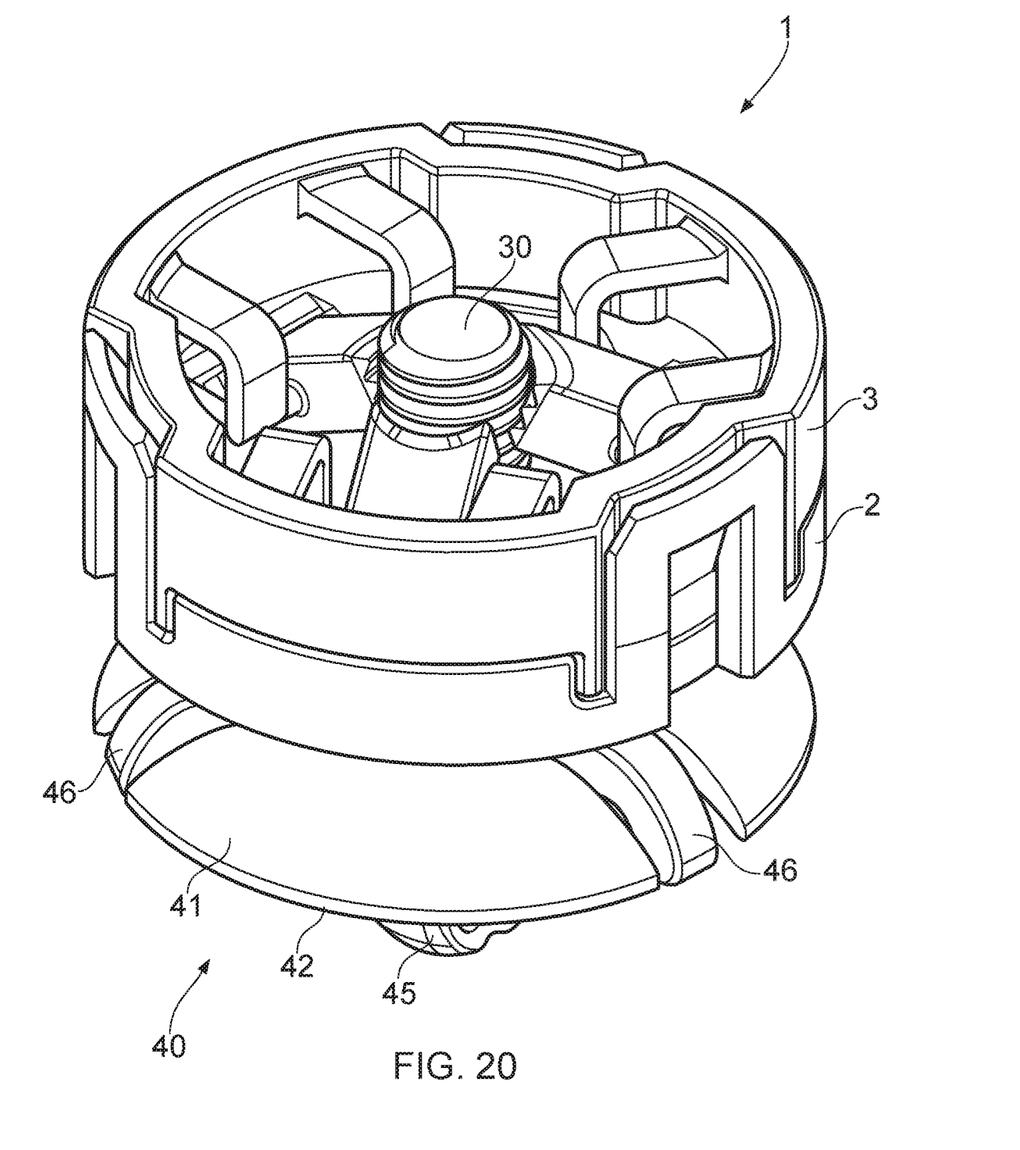
FIG. 20 shows the arrangement according to FIG. 19 in a perspective view from above.

In a further advantageous embodiment, the bolt fastener according to the invention is combined with an anchor clip as a mounting unit (FIGS. 18 to 20).

In a mounting unit consisting of the bolt fastener 1 according to the invention and an anchor clip bolt 40, the bolt fastener 1 is formed in a substantially identical manner, but securing means are present between the bolt fastener 1 and an anchor clip bolt 40, said securing means ensuring a correct seat of the bolt fastener 1 on the anchor clip 40 and also, after mounting, ensuring that the anchor clip 40 sits properly.

The anchor clip 40 has the axial bolt 30, wherein, at one thread end of the bolt 30, a support plate 41 is formed on the anchor clip 40 in a manner known per se.

This plate 41 is bent slightly counter to the direction of the bolt 30 at its encircling edge 42 or toward the encircling edge 42.

On a diametrically opposite axial side of the bolt 30, the anchor clip 40 having an anchor element 42 is formed, wherein the anchor element 42 has an axial straight carrier 43 which continues the bolt on the other side of the plate 41 and from which latching or rear-engagement arms 45 protrude at an opposite end 44 from the bolt 30 in a manner known per se.

In a known manner, the rear-engagement arms 45 cooperate with the bent plate 42 such that, when engaging behind an opening, in particular in a vehicle body panel, the rear-engagement arms snap outward and engage behind the hole while, in particular to secure the rear engagement, but also for rattle protection, the plate 42 is supported on the other side of a corresponding panel.

To ensure a correct fit both of the anchor clip 40 in a mounting opening (not shown) and to ensure that the bolt fastener can also be pushed fully onto the anchor clip 40 only in the event of a correct fit of the anchor clip, blocking fingers 46 are formed on the mounting unit according to the invention made up of the bolt fastener 1 and the anchor clip 40.

The blocking fingers 46 are angled elements with a first leg 47 and a second leg 48. The first leg 47 rests in the plate 41 and extends outward from a region next to a bolt 30, but not in contact therewith. The leg 47 ends with a bent end 49, which is bent in the direction of the outer edge 42 of the plate 41, but protrudes beyond the encircling edge 42 in the direction of the carrier 43 of the anchor clip 40.

The blocking finger 46 is mounted in the plate 41 so as to be pivotable toward and away from the bolt 30, wherein it is arranged in its starting position such that the leg 48 diverges from the bolt 30.

The leg 48 has, at its free end 50, an outwardly pointing latching step 51, which is formed for example as a right-angled recess.

The latching step 51 cooperates with a latching step 52, which is formed close to an inwardly pointing edge of a region of the bottom wall 4 of the bolt fastener 1. The inwardly pointing edge 53 that forms the latching step 52 is in this case set back somewhat with respect to the encircling edge of the pass-through opening 5, with the result that a receiving opening 54 for the leg 46 is formed.

In this case, at least one blocking finger 46 can be present, but it is also possible for more blocking fingers 46, for example three blocking fingers 46 (FIG. 19), to be present.

The parts in this case cooperate as follows:

In the mounted state, the bolt fastener 1 is pushed onto the bolt such that the openings 54 are aligned with the blocking fingers 46. The insertion is then stopped by the cooperation of the latches 51, 52, because a corresponding latching edge 51 of the bottom wall 4 rests here in the latch 51 of the blocking finger 46. If the mounting unit consisting of the bolt fastener 1 and the anchor clip 40 is now inserted into an opening in a panel, for example a vehicle body panel, this block remains active until the anchor clip 40 has been inserted to such an extent that the rear-engagement arms 45, after being passed through the opening, are released again and snap outward. As a result of the length of the rear-engagement arms 45 toward their free ends, the rear engagement occurs only when the plate 41 has been applied with pressure.

As a result of this pressure, a force is also exerted on the free end 49 of the leg 47, which is pivoted upward as a result and thus the leg 46 is also pivoted toward the bolt 30, specifically until the latches 51, 52 disengage and the blocking finger leg 48 can pass fully into the opening 54. Once this has occurred, the bolt fastener can be pushed fully onto the bolt 30 from its premounting position shown in FIG. 18. In this embodiment, it is advantageous that, as a result, the bolt fastener can be used in a more variable manner, since, in a state premounted with a bolt, it can also set such a bolt in an existing opening.

Of course, this kind of temporary locking and securing can be achieved with any bolt fastener, as long as the latter is formed with the appropriate corresponding. The mounting unit is thus not limited in any way to a bolt fastener as described above. This represents an example for any possible bolt fastener.

In the case of the invention, it is advantageous that a socket cooperates as counter-bearing means with fixing means in the form of blocking elements such that, in the fully inserted state of a fastening bolt, the latter is held and prevented from being withdrawn, and after a maximum force has been applied or a maximum retaining force has been exceeded, by withdrawal of the bolt, the fixing means pass out of their counter-bearing means, such that the frictional fit between the fixing means and the guide bolt to be fixed is released.

Furthermore, it is advantageous that, in this construction, which is also cost-effective to produce, reliable setting of a minimum and a maximum force is allowed and also, as a result of the articulated arrangement of the fixing means on spring arms as guide and return means, the bolt fastener according to the invention can be reused for mounting after demounting, such that, for example, an interior trim element of a motor vehicle is removable and attachable again.

REFERENCE SIGNS

1 Bolt fastener
2 Bolt fastener bottom part
3 Bolt fastener top part
4 Bottom wall
5 Insertion opening
6 Bearing block
7 Bearing socket
8 Inclined ramp
9 Socket
10 Inclined top face
11 Guide cheeks
12 Guide face
13 Encircling outer wall
14 Latching tabs
15 Blocking element
16 Engagement face
17 Bearing face
18 Axial curvature
19 Outer wall
20 Spring arm
21 Free end
22 Bearing extensions
23 Side face
24 Latching protrusion
25 Guide slots
26 Guide protrusions
27 Arrow direction
28 Arrow direction
29 Arrow direction
30 Bolt
31 Contoured face
33 Receiving space
40 Anchor clip bolt
41 Support plate
42 Encircling edge
43 Carrier
44 End
45 Rear-engagement arms
46 Blocking finger
47 Leg
48 Leg
49 End
50 Free end
51 Latch
52 Latch
53 Edge
54 Opening

What is claimed is:

1. A bolt fastener comprising a plurality of fixing means (15) that are arranged radially around a receiving space for a bolt (30) and are axially pivotable,
   wherein the fixing means (15) have, in the direction of an axial receiving space (33) for a fastening bolt (30), engagement faces (16) for engagement with a bolt (30) and have, at diametrically opposite ends, bearing faces (17) with which the fixing means (15) are supported counter to an outward movement,
   wherein bearing means (9) for the bearing faces (17) are also provided, which cooperate in a supporting manner with the bearing faces (17), wherein the bearing face (17) and bearing means (9) are dimensioned such that they disengage when the fixing means (15) are pivoted counter to the insertion direction of the bolt (30), wherein the radial spacing between the bearing means (9) and a bolt (30) mounted in the receiving space (33) is smaller than the longitudinal extent of the fixing means (15).

2. The bolt fastener as claimed in claim 1, wherein the fixing means (15) are arranged in a suspended manner on axially and radially resilient spring arms (20), wherein the fixing means (15) are arranged on the spring arms (20) with lateral regions between the engagement faces (16) and the bearing faces (17).

3. The bolt fastener as claimed in claim 1, wherein a bearing face (17) of the fixing element (15) is formed with an axial curvature (18) and the bearing means (9) is in the form of a socket (9) with a corresponding concave curvature.

4. The bolt fastener as claimed in claim 3, wherein the concave curvature of the socket (9) is oriented such that the curvature arc does not go beyond a horizontal plane with regard to the axial insertion direction.

5. The bolt fastener as claimed in claim 1, wherein guide cheeks (11) that extend radially inward are arranged on both sides of the sockets (9), said guide cheeks (11) laterally delimiting the fixing means (15) with regard to the mobility thereof.

6. The bolt fastener as claimed in claim 1, wherein the fixing means (15) are in the form of blocking elements (15), which are substantially cuboidal elements that extend radially outward from a receiving space (33) and have, on a face radially facing the receiving space (33), the curved engagement face (16) for engagement in a fastening bolt (30).

7. The bolt fastener as claimed in claim 1, wherein the engagement face (16) is formed in a radially curved manner and a sawtooth and/or threaded-portion contour is formed as corresponding engagement means for the thread or the contour of a fastening bolt (30) projecting through an insertion opening (5).

8. The bolt fastener as claimed in claim 1, wherein respective spring arms (20) are arranged on the inside radially on both sides of the blocking elements (15), wherein the spring arms (20) initially extend inward in parallel from an inner face of an outer wall (19) and are bent toward the blocking elements (15), wherein the spring arms (20) end with free ends (21), wherein, at the level of the free ends (21), the spring arms (20) are arranged on respective side faces (23) of the blocking elements (15).

9. The bolt fastener as claimed in claim 1, wherein the spring arms (20) and the blocking elements (15) are arranged with respect to one another such that, in the force- and load-free state, the blocking elements (15) extend in an inclined manner toward the axial center or toward the receiving space (33) in the insertion direction of a bolt (30), such that when a bolt is inserted, the blocking elements (15) are pivotable in the insertion direction in order to ensure that the bolt (30) passes through, and in the event of a withdrawal movement of the bolt, are pivoted by the bolt into the receiving space (33) such that they are supported on the sockets (9) on one side with their bearing faces (17) and engage in the contour of a bolt on the other side with the engagement means of the engagement faces.

10. A mounting unit comprising a bolt fastener as claimed in claim 1, and an anchor clip (40), wherein the anchor clip has a bolt (30) and blocking means (46) are present on the anchor clip (40) that cooperate in a latching blocking manner with corresponding blocking means (51, 52) of a bolt fastener (1) such that the blocking is released only when the anchor clip is latched fully in an opening provided for this purpose and the bolt fastener (1) is able to be pushed fully onto the bolt (30).

11. A bolt fastener, comprising:

a plurality of fixing structures arranged radially around an axial bolt receiving space, wherein each fixing structure is axially pivotable, wherein each fixing structure has, in a direction of the axial bolt receiving space, engagement faces for bolt engagement and have, at diametrically opposite ends, bearing faces with which the fixing structure is supported counter to an outward movement, wherein bearing structures for the bearing faces cooperate in a supporting manner with the bearing faces, wherein the bearing faces and the bearing structures are dimensioned such that they disengage when the fixing structures are pivoted counter to a bolt insertion direction, wherein a radial spacing between the bearing structures and a bolt mounted in the axial bolt receiving space is smaller than a longitudinal extent of the fixing structures.

* * * * *